United States Patent
Jain et al.

(10) Patent No.: US 10,162,850 B1
(45) Date of Patent: Dec. 25, 2018

(54) CLAUSE DISCOVERY FOR VALIDATION OF DOCUMENTS

(71) Applicant: Icertis, Inc., Bellevue, WA (US)

(72) Inventors: Amitabh Jain, Pune (IN); Nagi Prabhu, Saratoga, CA (US); Monish Mangalkumar Darda, Pune (IN)

(73) Assignee: Icertis, Inc., Bellevue, WA (US)

( * ) Notice: Subject to any disclaimer, the term of this patent is extended or adjusted under 35 U.S.C. 154(b) by 0 days.

(21) Appl. No.: 15/949,905

(22) Filed: Apr. 10, 2018

(51) Int. Cl.
*G06F 17/30* (2006.01)
*G06N 99/00* (2010.01)
*G06F 17/27* (2006.01)

(52) U.S. Cl.
CPC .... *G06F 17/30371* (2013.01); *G06F 17/2705* (2013.01); *G06F 17/30011* (2013.01); *G06F 17/30598* (2013.01); *G06F 17/30722* (2013.01); *G06F 17/30864* (2013.01); *G06N 99/005* (2013.01)

(58) Field of Classification Search
CPC ............. G06F 17/2725; G06F 17/2785; G06F 17/30011; G06F 17/30598; G06F 17/30722; G06F 17/30864; G06F 17/3053; G06F 17/30401; G06F 17/3043; G06F 17/2705; G06F 17/30371
See application file for complete search history.

(56) References Cited

U.S. PATENT DOCUMENTS

| | | | | |
|---|---|---|---|---|
| 7,617,164 B2 * | 11/2009 | Burges | ................ | G06N 99/005 706/15 |
| 8,626,682 B2 * | 1/2014 | Malik | ................... | G06K 9/6259 706/12 |
| 8,868,472 B1 * | 10/2014 | Lin | ....................... | G06N 99/005 706/12 |
| 8,965,814 B1 * | 2/2015 | Rangan | .................... | G06N 5/02 706/12 |
| 9,235,812 B2 * | 1/2016 | Scholtes | ................ | G06F 17/30 |
| 9,922,285 B1 * | 3/2018 | Glode | ................ | G06N 3/0445 |
| 2007/0239632 A1 * | 10/2007 | Burges | ................ | G06N 99/005 706/15 |
| 2008/0101689 A1 * | 5/2008 | Forman | .................. | G06K 9/623 382/159 |

(Continued)

FOREIGN PATENT DOCUMENTS

WO     WO 2009/061917    * 5/2009

OTHER PUBLICATIONS

Alfredo Vellido et al., "Making machine learning models interpretable", ESANN 2012 proceedings, European Symposium on Artificial Neural Networks, Computational Intelligence and Machine Learning. Bruges (Belgium), Apr. 25-27, 2012, pp. 163-172.*

*Primary Examiner* — Srirama Channavajjala
(74) *Attorney, Agent, or Firm* — John W. Branch; Lowe Graham Jones PLLC

(57) ABSTRACT

Embodiments are directed to managing documents where clauses in a document may be identified. Evaluations of the clauses may be provided based on evaluators and machine learning (ML) models that assign each of the clauses to a category and a confidence score. Actions associated with the clauses may be monitored including updates to content of the clauses. Inconsistent evaluations associated with the clauses be identified. The ML models may be retrained based on the content of the clauses associated with the inconsistent evaluations.

26 Claims, 11 Drawing Sheets

(56) References Cited

U.S. PATENT DOCUMENTS

| | | | | |
|---|---|---|---|---|
| 2013/0066818 | A1* | 3/2013 | Assadollahi | G06N 5/00 706/12 |
| 2014/0156567 | A1* | 6/2014 | Scholtes | G06F 17/30 706/12 |
| 2014/0172416 | A1* | 6/2014 | Soroker | G06F 17/2785 704/9 |
| 2014/0280238 | A1* | 9/2014 | Cormack | G06N 99/005 707/749 |
| 2016/0071022 | A1* | 3/2016 | Bruno | G06F 17/30693 706/12 |
| 2016/0358099 | A1* | 12/2016 | Sturlaugson | G06N 5/043 |
| 2018/0150454 | A1* | 5/2018 | Sharma | G06F 17/2211 |

* cited by examiner

| Doc ID | Parent Doc ID | Clause ID | Parent Clause | Doc Type | Clause Type | Word Count | Position | ... |
|---|---|---|---|---|---|---|---|---|
| 100 | N/A | 600 | N/A | Contract I | Preamble | 40 | 1 | {...} |
| 102 | N/A | 656 | N/A | Contract II | Warranties | 80 | 45 | {...} |
| 106 | N/A | 1103 | N/A | License I | Choice of Law | 30 | 23 | {...} |
| 110 | 106 | 1114 | 1103 | License I | Choice of Law | 45 | 12 | {...} |

*Fig. 6*

CLAUSE DISCOVERY FOR VALIDATION OF DOCUMENTS

TECHNICAL FIELD

The present invention relates generally to document management, and more particularly, but not exclusively, to analyzing document content.

BACKGROUND

Documents, including legal contracts, are becoming increasingly complex, varied and unstructured. It takes a skilled human to understand and analyze documents to break them into their constituent clauses and sections. Years of training and experience may be required to ensure that the content and structure are well understood before a new document can be analyzed and broken down effectively. Unfortunately, this is an individual, manual, tedious, time consuming and expensive process and does not use the collective experience of a large number of people. People who routinely deal with new documents could benefit significantly from an automated process for breaking a document down to a semantic structure that has meaning in the context of the document and the domain and business that the document refers to or affects.

Analyzing a document manually is a time consuming and error prone process. The accuracy of the results is also heavily dependent on the experience and training of the person performing the process. Additionally, the manual way of extraction does not leverage the collective intelligence of people who understand the structure and the business.

Further, it is not enough to break a document down into its constituent clauses and sections—these clauses and sections also need to be surfaced when required—for example, when taking an action on a contract like approving a contract, it is useful to see the contract broken down to its constituents when reading it before approval.

Existing solutions are not designed to handle arbitrary structures well within the context and the domain and the business process and do not benefit from a large corpus of pre-catalogued data. They do not surface this information in the context of the business process. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 6 illustrates a logical representation of a data object for tracking clauses for validating documents in accordance with one or more of the various embodiments;

DETAILED DESCRIPTION OF VARIOUS EMBODIMENTS

Figure 1:
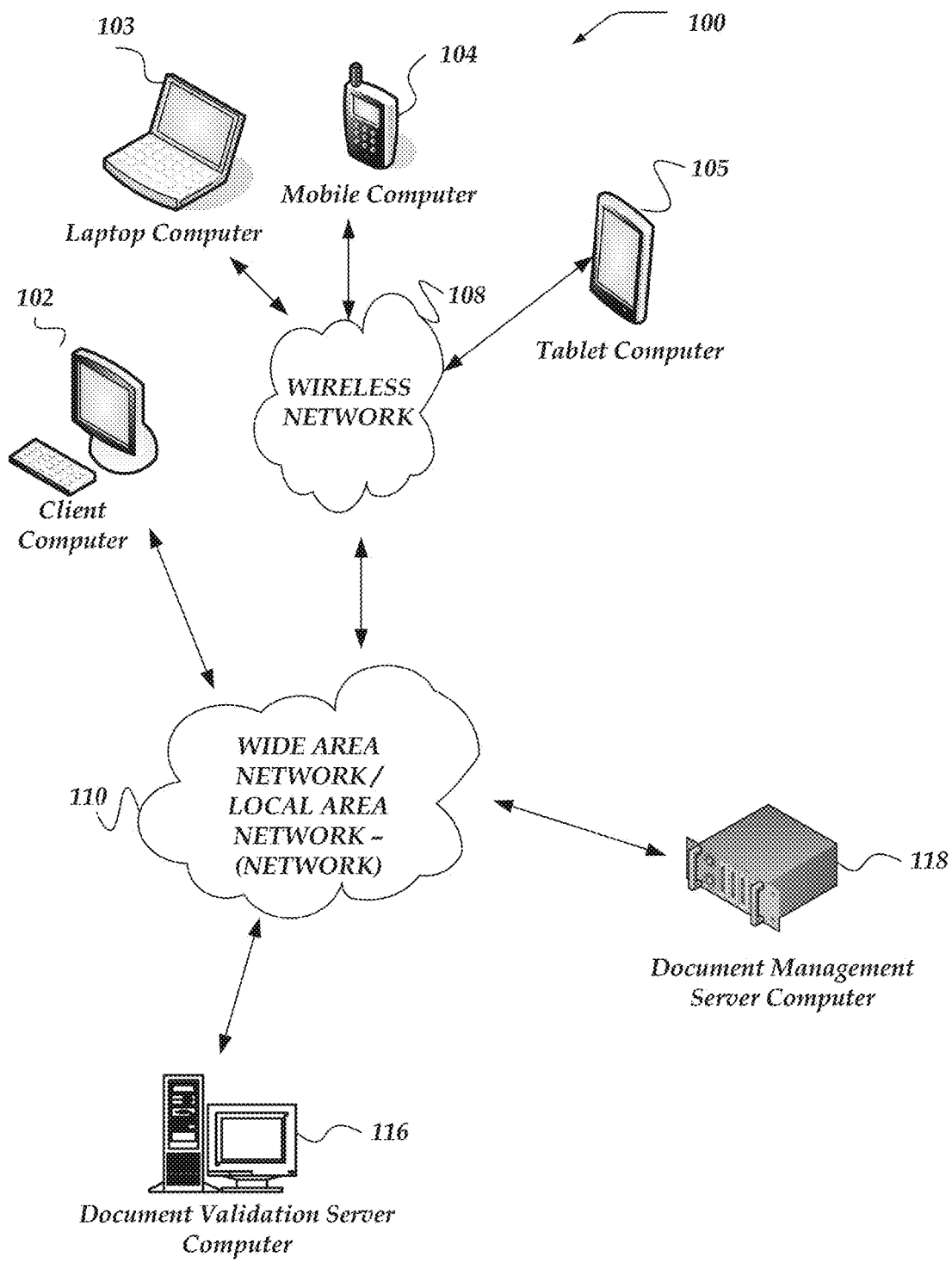
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term, "evaluator" refers to a package or bundle of computer readable instructions, configuration information, rules, patterns, regular expressions, condition logic, branching logic, software libraries, FPGAs, ASICs, or the like, or combination thereof that may be used to evaluate documents or document clauses. In some cases, evaluators may be used determine characteristics about a clause or document. Various evaluators may be specialized for identifying or validating one or more categories of clauses or validating one or more document types. In some embodiments, organizations or users may provide custom evaluators to identify clause categories or document types that may be unique to their organization.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing documents over a network. In one or more of the various embodiments, a document engine may be instantiated to identify one or more clauses in a document such that the document may be associated with one or more document types.

In one or more of the various embodiments, the document engine may perform further actions including: scanning the document to determine its format and file type; and parsing the document based on its file format and file type to provide the one or more clauses.

In one or more of the various embodiments, a validation engine may be instantiated to provide one or more evaluations for the one or more clauses based on one or more evaluators and one or more machine learning (ML) models such that the one or more evaluations are employed to assign each of the clauses to one of a plurality of categories, and such that each of the one or more clauses is associated with a confidence score based on the one or more evaluations.

In one or more of the various embodiments, providing the one or more evaluations, further comprises: comparing content of the one or more clauses to a previously evaluated clause that is stored in a repository; and assigning the category to the one or more clauses based on an affirmative result of the comparison, wherein the category that is assigned to the one or more clauses is the same category that is assigned to the previously evaluated clause.

In one or more of the various embodiments, providing the one or more evaluations may include: providing one or more textual evaluators that evaluate one or more of grammar, parts-of-speech, word-counts, or character counts of the one or more clauses; providing one or more semantic evaluators based on the one or more document types; and assigning the category and the confidence score to the one or more clauses based on the one or more evaluations performed by one or more of textual evaluators or the semantic evaluators.

In one or more of the various embodiments, the validation engine may perform actions, including: determining the one or more ML models based on the category assigned to the one or more clauses; classifying the one or more clauses based on the one or more ML models; and employing a result of the classification to modify the confidence score associated with the one or more clauses.

In one or more of the various embodiments, the validation engine may monitor one or more actions associated with the one or more clauses such that the one or more actions include one or more updates to content of the one or more clauses.

In one or more of the various embodiments, the validation engine may identify one or more inconsistent evaluations such that the inconsistent evaluations may be associated with the one or more clauses that have a confidence score that exceeds a high threshold value and also a quantity of content updates that exceeds another high threshold value.

In one or more of the various embodiments, the validation engine performs further actions, including: evaluating the overall document based on the one or more clauses and the one or more document types, wherein an overall quality score is assigned to the document based on the overall evaluation; increasing the overall quality score for the document when the one or more clauses required by the one or more document types are included in the document; and decreasing the overall quality score for the document when the one or more clauses prohibited from the one or more document types are included in the document.

In one or more of the various embodiments, the validation engine performs further actions including: identifying one or more entities included in the one or more clauses such that the one or more entities include one or more of dates, locations, email addresses, person names, party identifiers, or place names; confirming that one or more values for the one or more entities are consistent throughout the document; and identifying the one or more clauses that incorrectly omit one or more of the one or more entities.

In one or more of the various embodiments, a machine learning (ML) engine may retrain a portion of the one or more ML models based on the updated content of the one or more clauses associated with the inconsistent evaluations such that the retrained portion of the one or more ML models associate one or more increased confidence scores with each of the one or more clauses that already include content that may be equivalent to the content updates of the one or more clauses associated with the inconsistent evaluations, and such that the retrained portion of the one or more ML models associate one or more decreased confidence scores with the one or more clauses associated with the one or more inconsistent evaluations.

In one or more of the various embodiments, instantiating a feedback engine to display a report that includes the document and the one or more clauses such that the category and the confidence score associated with each clause may be included in the report; and capturing the one or more actions that are stored in an activity journal.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, document validation server computer 116, document management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, document validation server computer 116, document management server computer 118, or other computers.

Client computers 102-105 may further be configured to include a client application that enables an end-user to log into an end-user account that may be managed by another computer, such as document validation server computer 116, document management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by document validation server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, document validation server computer 116, document management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of document validation server computer 116, document management server computer 118 are described in more detail below in conjunction with FIG. 3. Although FIG. 1 illustrates document validation server computer 116, document management server computer 118 each as a single computer, the innovations or embodiments are not so limited. For example, one or more functions of document validation server computer 116, document management server computer 118, or the like, may be distributed across one or more distinct network computers. Moreover, in one or more embodiments, document validation server computer 116, document management server computer 118 may be implemented using a plurality of network computers. Further, in one or more of the various embodiments, document validation server computer 116, document management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
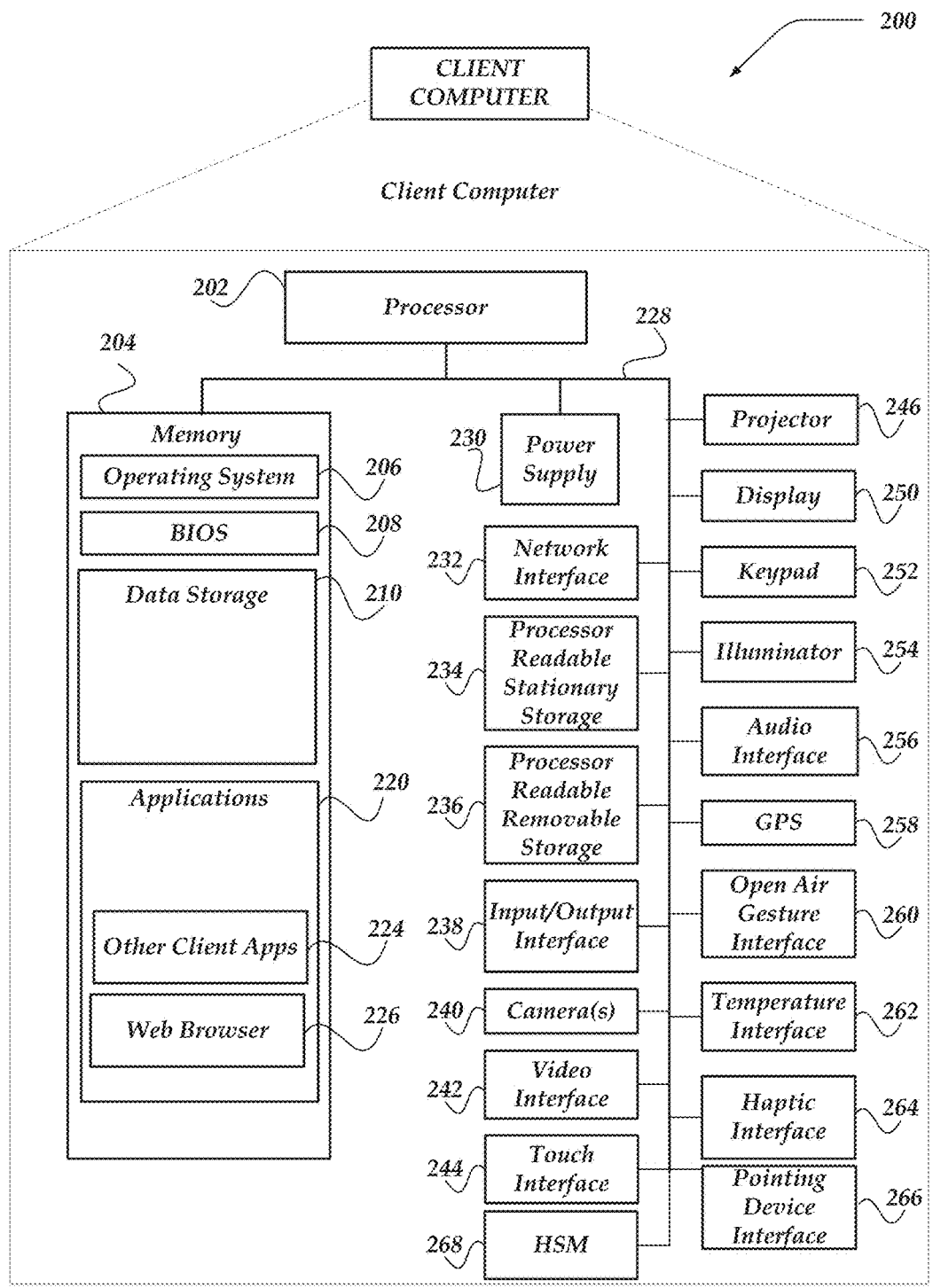
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in documents, clauses, evaluators, machine learning models, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, document management operations, document administration, document evaluation, document clause discovery, queries, searches, messages, notification messages, event messages, alerts, performance metrics, log data, API calls, or the like, combination thereof, with document validation server computers or document management server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
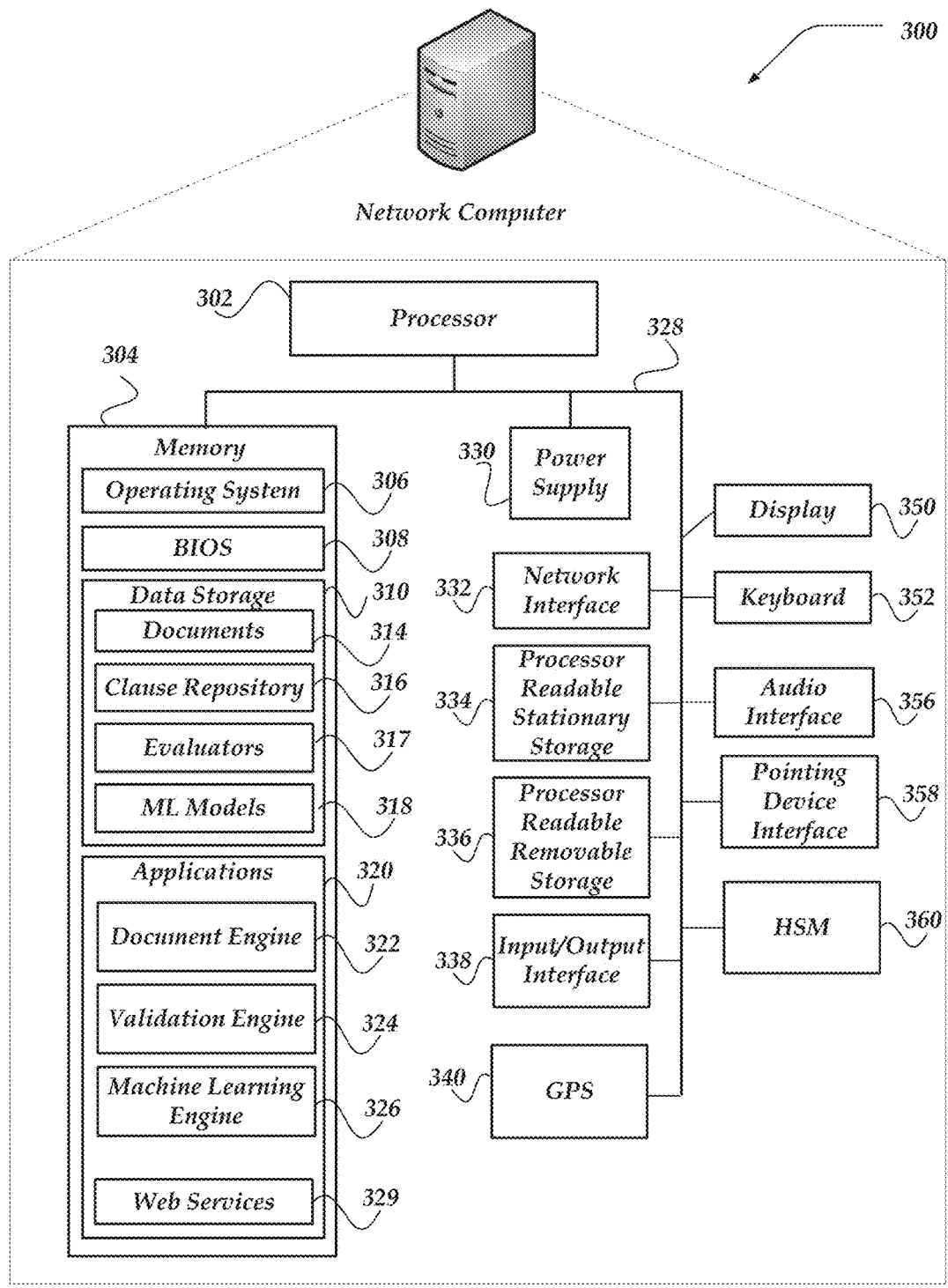
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of document validation server computer 116, or document management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, document engine 322, validation engine 324, machine learning engine 326, web services 329, or the like, may be arranged to employ geo-location information to select one or more localization features, such as, time zones, languages, currencies, currency formatting, calendar formatting, or the like. Localization features may be used in documents, clauses, clause meta-data, file systems, user-interfaces, reports, textual evaluators, semantic evaluators, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, documents 314, clause repository 316, evaluators 317, machine learning models 318, or the like. Documents 314 may store files, documents, versions, properties, meta-data, data structures, or the like, that represent one or more portions of a document, including raw documents or documents that have underdone clause discovery. Clause repository 316 may store one or more clauses that have previously been evaluated or validated. Evaluators 317 may store one or more textual evaluators, one or more semantic evaluators, or the like. Machine learning models 318 may store one or more machine learning models that may be trained for classifying one or more clauses or documents.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include document engine 322, validation engine 324, machine learning engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, document engine 322, validation engine 324, machine learning engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to document engine 322, validation engine 324, machine learning engine 326, web services 329, or the like, may be provisioned and de-commissioned automatically.

Also, in one or more of the various embodiments, document engine 322, validation engine 324, machine learning engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
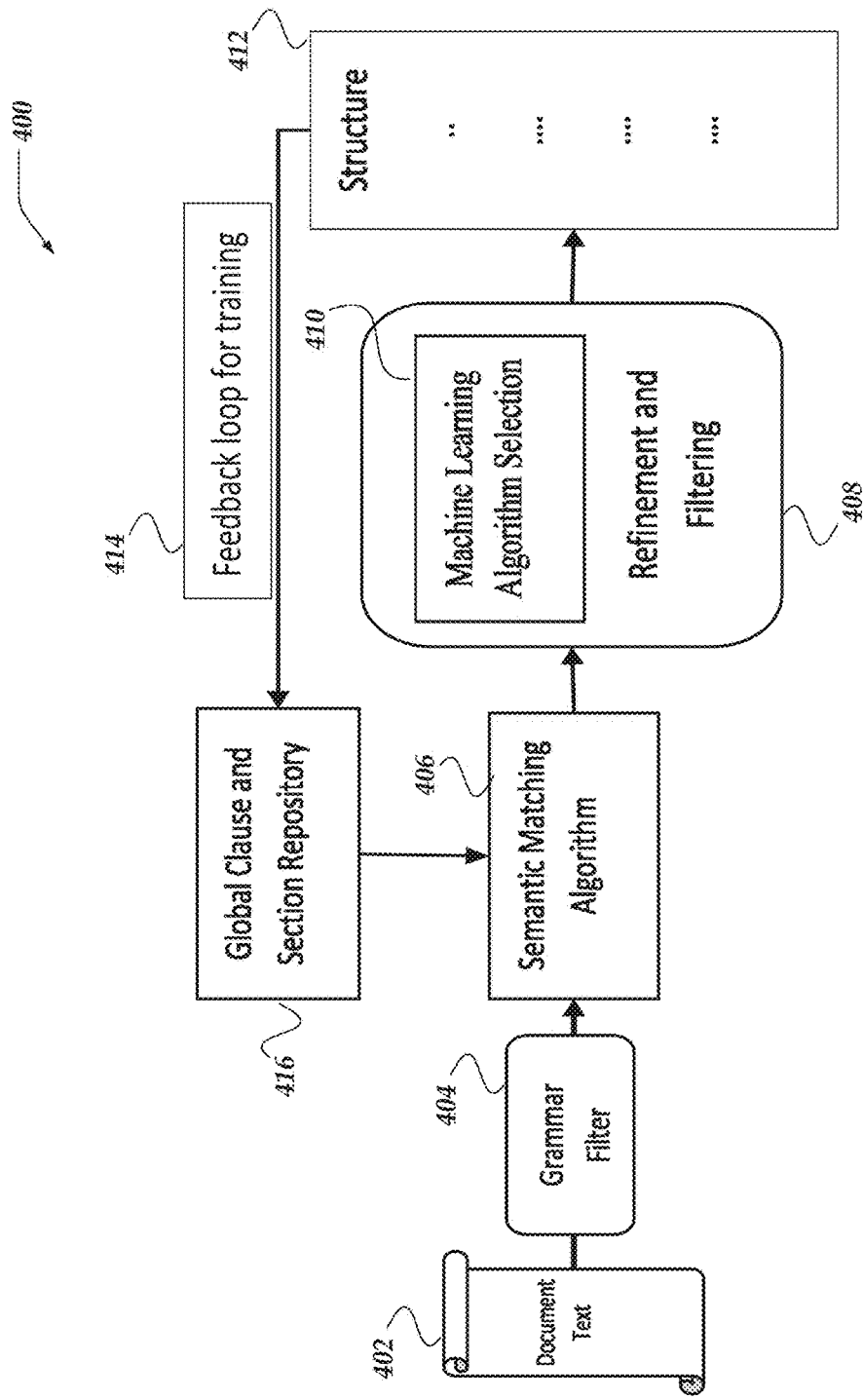
FIG. 4 illustrates a functional schematic of a system for clause discovery for validation of documents in accordance with one or more of the various embodiments.

FIG. 4 illustrates a function schematic of system 400 for clause discovery for validating documents in accordance with one or more of the various embodiments. In one or more of the various embodiments, document text 402 may be provided to a document validation server, such as, document validation server computer 116. In some embodiments, document text 402 may be provided from a database or document management server. In some embodiments, a client computer, such as, client computer 200 may be arranged to provide one or more documents to a document validation server that comprises various processing engines, such as, document engine 322, validation engine 324, or the like. In one or more of the various embodiments, some or all of the functions in system 400 may be performed by one or more document engines or one or more validation engines that may be running on one or more network computers.

In one or more of the various embodiments, document text 402 may be provided to grammar filter 404. In one or more of the various embodiments, grammar filter 404 may be arranged to perform textual analysis of the one or more clauses that make up document 402. In one or more of the various embodiments, grammar analysis may include separating sentences, subjects, predicates, phrases, parts-of-speech, paragraphs, words, formatting, or the like.

In one or more of the various embodiments, a document engine may be arranged to apply one or more rules (e.g., evaluators) to identify one or more grammar elements included in document text 402. In one or more of the various embodiments, the rules may include pattern matching, or the like. One or more evaluators may be provided from databases or configuration information that support continuous updating or modification.

In one or more of the various embodiments, there may be different evaluators for different languages, documents, or the like. For example, in some embodiments, if system 400 is arranged to support clause discovery for validation of legal contracts it may use different evaluators than systems arranged for validating other types of documents, such as, scientific papers.

In one or more of the various embodiments, grammar filtering may include identifying candidate clauses that may be in a document. In some embodiments, a document engine may perform grammar filtering and then provide a collection of data structures that represent the clauses or paragraphs discovered in a document. In one or more of the various embodiments, these data structures may include meta-data fields for tracking parts-of-speech information associated with a clause. For example, the meta-data may include information such as, counts of various parts-of-speech, positions of parts-of-speech, grammar error counts, word counts, character counts, position with document, or the like, or combination thereof.

In one or more of the various embodiments, clauses may represent portions of a document that have particular meaning or purpose that may be expected to be included (in some form) in a given documents of a given type. Documents of particular types may be expected to have certain clauses. For example, in one or more of the various embodiments, documents that are contracts may be expected to have one or more clauses that a medical report may be unlikely to include.

Accordingly, in one or more of the various embodiments, if a document is a contract it may be expected to have one or more clauses that have particular content requirements. Note, in some embodiments, the required type of clauses or the content of particular clauses may be expected to vary depending on the subject matter covered by the contract or the requirements of one or more parties to the contract.

Next, in one or more of the various embodiments, the clauses may undergo semantic matching 406 to assign the clauses to a clause category. In one or more of the various embodiments, semantic matching may include running a battery of semantic evaluators to identify the category of a clause. In one or more of the various embodiments, the one or more semantic evaluators may include natural language processing that attempts to identify the semantic meaning of a clause or parts of clauses.

In one or more of the various embodiments, one or more semantic evaluators may look for partial matches of various word fragments that may be used to categorize a clause. For example, in some embodiments, a particular category of clauses may be expected to have one or more sentence fragments that are typically included in such clauses.

In one or more of the various embodiments, a document engine may be arranged to assign one or more confidence scores for each evaluated clause that may represent how closely the clause matches the requirements for clause category. In one or more of the various embodiments, a document engine may be arranged to track multiple confidence scores for each clause each associated with different clause categories.

In one or more of the various embodiments, one or more semantic evaluators may be arranged to be cumulative in the sense that each evaluation contributes to the confidence score. Further, in some embodiments, one or more semantic evaluators may be arranged to be more important or otherwise weighted heavier than one or more other semantic evaluators. Likewise, in one or more of the various embodiments, one or more semantic evaluators may be arranged to reduce one or more confidence scores that may be associated with clauses.

In one or more of the various embodiments, semantic evaluators may be arranged such that certain evaluations may exclude one or more clauses from further processing. For example, in some embodiments, one or more semantic evaluators may test for close content matches of the entire clause. For example, in one or more of the various embodiments, clauses that are close or exact matches to known clauses (e.g., from a clause repository) may be considered identified without performing further processing.

Next, in one or more of the various embodiments, one or more clauses may be provided to a validation engine, such as, validation engine 324, for additional refinement or filtering 408. In one or more of the various embodiments, if one or more clauses have a confidence score that exceeds a defined threshold value, those clauses may be considered identified and validated without the validation engine performing additional actions. Otherwise, the clauses may be subject to further analysis that may include instantiating one or more machine learning (ML) engines to classify the one or more clauses.

In one or more of the various embodiments, one or more ML models may be selected to classify the clauses. The results provided by the ML models may be used to supplement the confidence score provided during semantic evaluation. In one or more of the various embodiments, the particular ML models or the application of the results provided by the one or more ML models may be applied in various ways depending on the type of ML model, the type of documents, the category of clauses, or the like.

In one or more of the various embodiments, clauses may be associated with more than one category with each category having its own confidence score. Likewise, in some embodiments, it may be appropriate to associate two or more categories with one or more clauses. For example, in some embodiments, some clause categories may be arranged to represent broad categories while other categories may be more specific. Accordingly, in some embodiments, it is possible for a clause to have high confidence scores for two or more clause categories at the same time. For example, a clause may be a match for both a general category and one or more specific categories.

Next, in one or more of the various embodiments, document structure 412 may be analyzed with respect the evaluated clauses. In one or more of the various embodiments, the system may be provided the type of document directly when the raw document is provided. In other embodiments, the system may attempt to derive the document type from the clauses that were discovered from the document. In one or more of the various embodiments, some or all of the clause meta-data may be used to characterize the document in attempt to identify its type or to confirm its type. For example, in one or more of the various embodiments, a subset of the clause meta-data, such as, clause category, clause position, or the like, may be used to form an attribute vector that may be matched against attribute vectors from archived documents of a known type.

Also, in one or more of the various embodiments, one or more machine learning (ML) models may be arranged to classify documents. In some embodiments, ML models may be trained to classify documents based on various features associated with a document, such as, the raw content, clause characteristics (e.g., clause meta-data), or the like.

In one or more of the various embodiments, a validation engine may be arranged to perform actions for structure analysis 412 that may include, looking for missing clauses, extra or extraneous clauses, quality of clause matches, number of unmatched clauses, grammar errors, missing field values, mismatched clauses (e.g., mutually exclusive clauses in same document), or the like. In one or more of the various embodiments, structure analysis 412 may include the execution of one or more evaluations that may be selected or customized based on the type of documents that may be expected. For example, if system 400 is arranged for validating legal contracts it may be arranged to use different evaluation actions that a system arranged to validate medical records documents.

Next, in one or more of the various embodiments, the processed and classified document may be provided to one or more systems for further evaluation or actions, including remediation, editing, approval/disapproval, rejection, acceptance, or the like, or combination thereof. In some embodiments, documents may be forwarded to another service for further processing. In one or more of the various embodiments, a validation engine may be arranged to route a document to one or more workflows for further analysis or evaluation that may be separate from the clause discovery for document validation system. For example, in some embodiments, an organization may designate that documents having certain characteristics should be routed to one or more responsible persons or sub-organization for approval or review before final acceptance.

Accordingly, in some embodiments, a validation engine may be arranged to apply one or more evaluators that define one or more conditions that may be tested by the validation engine to determine if a document should be routed to a workflow and to determine the which workflow.

In one or more of the various embodiments, documents may be displayed in a user-interface that enables a user to view the documents, the clauses, clause meta-data, or the like. In some embodiments, problematic clauses may be highlighted or otherwise brought to the attention of the users. In some embodiments, the validation engine may be arranged to provide a selection of one or more example clauses that may be included in the document. In one or more of the various embodiments, such clauses may be recommended to account for clauses that were missing, omitted, unrecognized, or the like, in the provided document.

In one or more of the various embodiments, the clauses recommended or suggested for adding to a document may include standard clauses that an organization prefers to include in all documents of a given type—boilerplate clauses. In some embodiment, the organization may configure the system to replace one or more categories of clauses with particular language. For example, even though an analyzed document includes a Choice of Law clause, an organization may require that a clause using particular pre-approved language be used rather than the clause that was discovered in the raw document.

In one or more of the various embodiments, a validation engine may be arranged to identify one or more clauses that may need to be corrected. For example, one or more clauses may be poorly matched or classified as indicated by having one or more confidence scores that may be below a required threshold value. Likewise, in one or more of the various embodiments, the validation engine may be configured to one or more 'automatic' corrections (e.g., word misspellings).

Note, in one or more of the various embodiments, as mentioned, some clauses or clause categories may be more critical or important than others. Accordingly, in some embodiments, the validation engine may be configured to perform automatic corrections for some clause categories without requiring specific approval. Whereas, some clauses or documents may be deemed so critical that all changes or corrections must be individually approved by a user, service, workflow, or the like.

In one or more of the various embodiments, a validation engine may be arranged to determine one or more clauses that may be presented to be corrected by a user. For example, in one or more of the various embodiments, not all clause categories or document types will have the same level of detailed semantic evaluators or well-trained machine learning models. Accordingly, in some embodiments, this may disable the validation engine from making specific recommendations or corrections. For example, in one or more of the various embodiments, the confidence scores for one or more clauses may fall below the acceptance threshold, but the validation engine may not be able to determine a reason for the low scores. Accordingly, in one or more of the various embodiments, a user may be relied on to provide the corrections.

In one or more of the various embodiments, the user may be enabled to associate one or more tags, labels, or the like, to errors with one or more clauses. In some embodiments, the user may simply modify the confidence score to increase it if applicable. Note, in some embodiments, a user may be enabled to decrease the confidence scores associated with one or more clauses as well. In some embodiments, some clauses may be associated with more than one confidence scores each associated with a different clause category. Accordingly, in one or more of the various embodiments, a user may observe that the clause actually matches one category and not the others. Thus, for example, the user may be enabled to zero out or reduce the other category confidence scores.

In one or more of the various embodiments, a validation engine may be arranged to track user activity directed towards documents or its one or more clauses. In one or more of the various embodiments, the validation engine may be arranged to track actions, such as, corrections, tagging, labeling, approvals, rejections, annotations, or the like, or combination thereof. Accordingly, in some embodiments, each clause may be associated with an activity journal that may store a record of each interaction, evaluation, modification, or the like, associated with the clause. Also, in one or more of the various embodiments, individual documents may be associated with activity journals that may be separate from the activity journals associated with each clause.

In one or more of the various embodiments, the activity journals may include change information that preserves the various versions of clauses or documents in the system. In some embodiments, the activity journals may include or reference version information that enable one or more past versions to be provided or reconstructed from change records.

In one or more of the various embodiments, activity journals may include records that include information that show the actions performed by the document engine or validation engine during intake or processing of document.

In one or more of the various embodiments, some or all of the activity journal information may be used to train or update machine learning models used to classify clauses or documents. Also, in one or more of the various embodiments, the raw document associated with a validated document may be stored and associated with the clauses, activity journals, or the like, for future reference. In some embodiments, the raw document may be stored with a hash digest value, checksum value, cryptographic signature, or the like, that may be used to authenticate or verify its contents. In one or more of the various embodiments, the document engine or validation engine may be configured to generate a hash digest value, checksum value, cryptographic signature, or the like, for each new document or raw document. In some embodiments, the raw document may be provided with a hash digest value, checksum value, cryptographic signature, or the like, from the original creator of the raw document. Accordingly, in one or more of the various embodiments, this value may be stored with the document information. In some embodiments, the validation engine or document engine may be arranged to generate a validation value (e.g., a hash digest value, checksum value, cryptographic signature, or the like) even if the raw document owner provided one.

Next, in one or more of the various embodiments, the discovered clauses, the documents, the related activity journals may be stored in clause repository 416. In some embodiments, information stored in the clause repository may be subsequently used for evaluating other documents or training machine learning models.

In one or more of the various embodiments, systems, such as, system 400 may be used for evaluating documents generated by an organization before they are used. Likewise, in one or more of the various embodiments, documents provided from an external source may be evaluated as well. For example, if two organizations are in the process of negotiating the terms of a legal contract, the changes provided or recommended by the validation engine may be incorporated such that other party may be see them clearly (e.g., red-lined).

In one or more of the various embodiments, the document validation server may be arranged to enable both party to a negotiation to directly interact with clauses or documents via an user-interface or application that enables them to near-simultaneously enter feedback directly into the document validation server for real-time application by the validation engine or document engine. For example, a user from a first organization may suggest one or more clauses for inclusion in a document. And, for example, a user from a second organization may approve one or more of the suggested clauses or counter with their own suggested clauses. In this way, in some embodiments, the history of the negotiation process and the evolution of the document may be tracked for later review.

Figure 5:
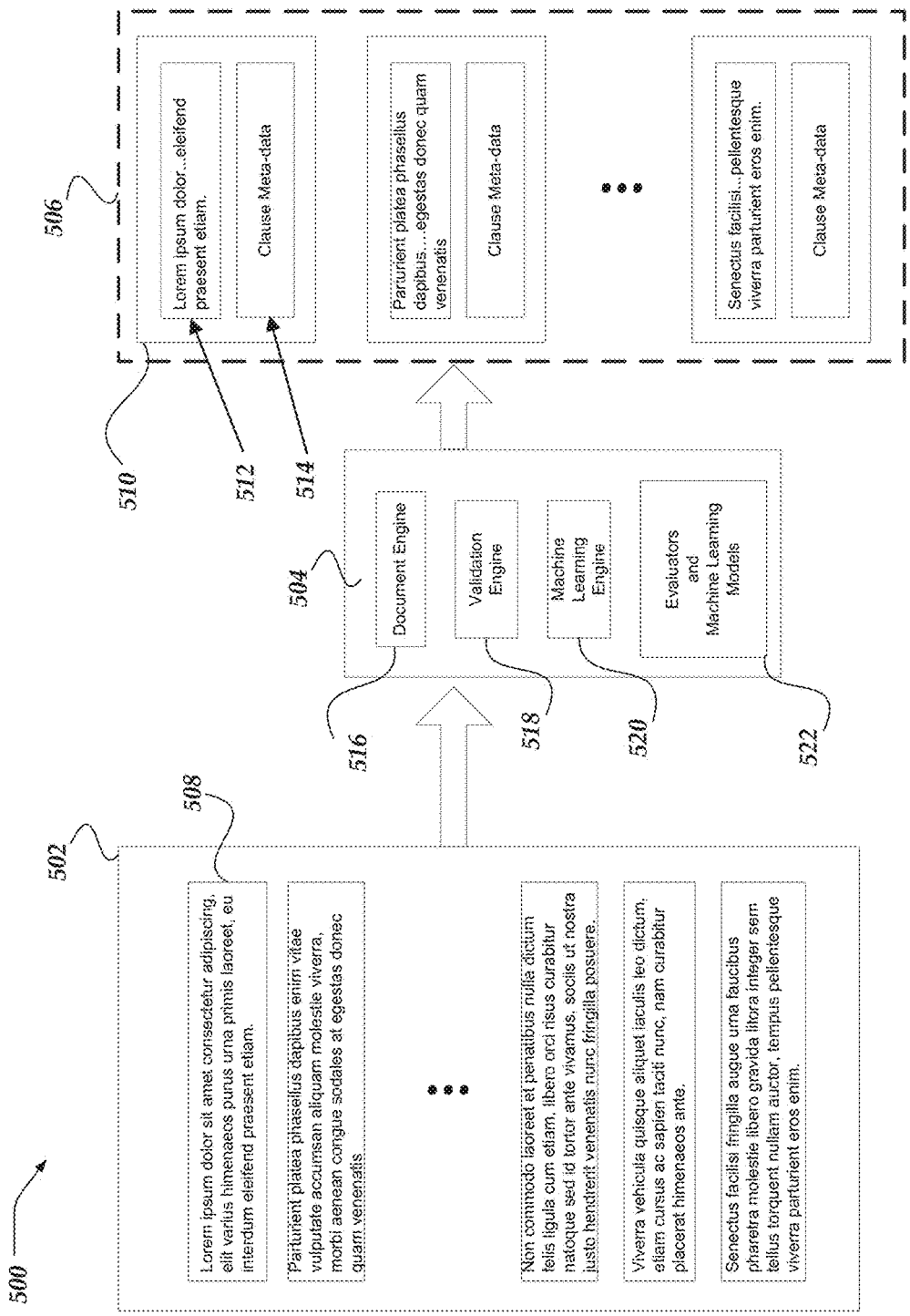
FIG. 5 illustrates a portion of a logical schematic of a system for clause discovery for document validation in accordance with one or more of the various embodiments.

FIG. 5 illustrates a portion of a logical schematic of system 500 for clause discovery for document validation in accordance with one or more of the various embodiments. System 500 includes raw document 502 that may be provided to document validation server 504 to produce validated document 506. In this example, raw document 502 includes several paragraphs, such as, paragraph 508. Accordingly, in some embodiments, document validation server 504, that includes one or more document engines 516 and one or more validation engines 518 may process raw document 502 to produce validated document 506 that includes one or more clauses, such as, clause 510. In one or more of the various embodiments, one or more machine learning engines 520 may be arranged to further refine the evaluation, validation, or classification of clauses. Further, in one or more of the various embodiments, one or more evaluators and machine learning models 522 may be used by document engine 516, validation engine 518, or machine learning engine 520 to identify, evaluate, validate, or classify one or more documents or clauses.

In this example, clause 510 may be a data structure that includes clause content 512 and clause meta-data 514. One of ordinary skill in the art will appreciate that data structures, such as clause 510 may be arranged differently without departing from the scope of the innovations disclosed herein. For example, in some embodiments, clause meta-data may be stored separately from the clause content. Likewise, in one or more of the various embodiments, validated document 506 may be indirectly associated with its constituent validated clauses rather being a container as shown here.

FIG. 6 illustrates a logical representation of data object 600 for tracking clauses for validating documents in accordance with one or more of the various embodiments. In one or more of the various embodiments, data object 600 may represent clauses or clause meta-data. In some embodiments, data object 600 may include various attributes for represent characteristics of clauses. In one or more of the various embodiments, these attributes may include: Doc ID 602, representing a document, if any, that is associate with a clause; Parent Doc ID, may represent a parent document, if any, that may be associated with the document a clause is associate with; Clause ID may represent an identifier of the clause; Parent Clause ID may represent the ID of a parent clause, if any, that may be associated with a clause; Doc Type may represent a document type of the document a clause may be associated with; clause category, may represent the category of the clause; word count may represent the number of words included in the text/body (not shown) of a clause; Position may represent the position in the document of the clause; and additional attributes 618 represents that data object 600 may be arranged to have more attributes types that are shown here. For example, additional attributes 618 may be assumed to represent additional clause meta-data, document meta-data, activity journals (or references to such), or the like.

In one or more of the various embodiments, data object 600 may be arranged to include one or more self-referential records that improve the performance of one or more computing resources by enabling higher-order relationships to be represented in the same data object rather than requiring separate data objects to maintain those relationships.

Generalized Operations

FIGS. 7-11 represent generalized operations for clause discovery for document validation in accordance with one or more of the various embodiments. In one or more of the various embodiments, processes 700, 800, 900, 1000, and 1100 described in conjunction with FIGS. 7-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-11 may be used for clause discovery for document validation in accordance with at least one of the various embodiments or architectures such as those described in conjunction with FIGS. 4-6. Further, in one or more of the various embodiments, some or all of the actions performed by processes 700, 800, 900, 1000, and 1100 may be executed in part by document engine 322, validation engine 324, or machine learning engine 326 running on one or more processors of one or more network computers.

Figure 7:
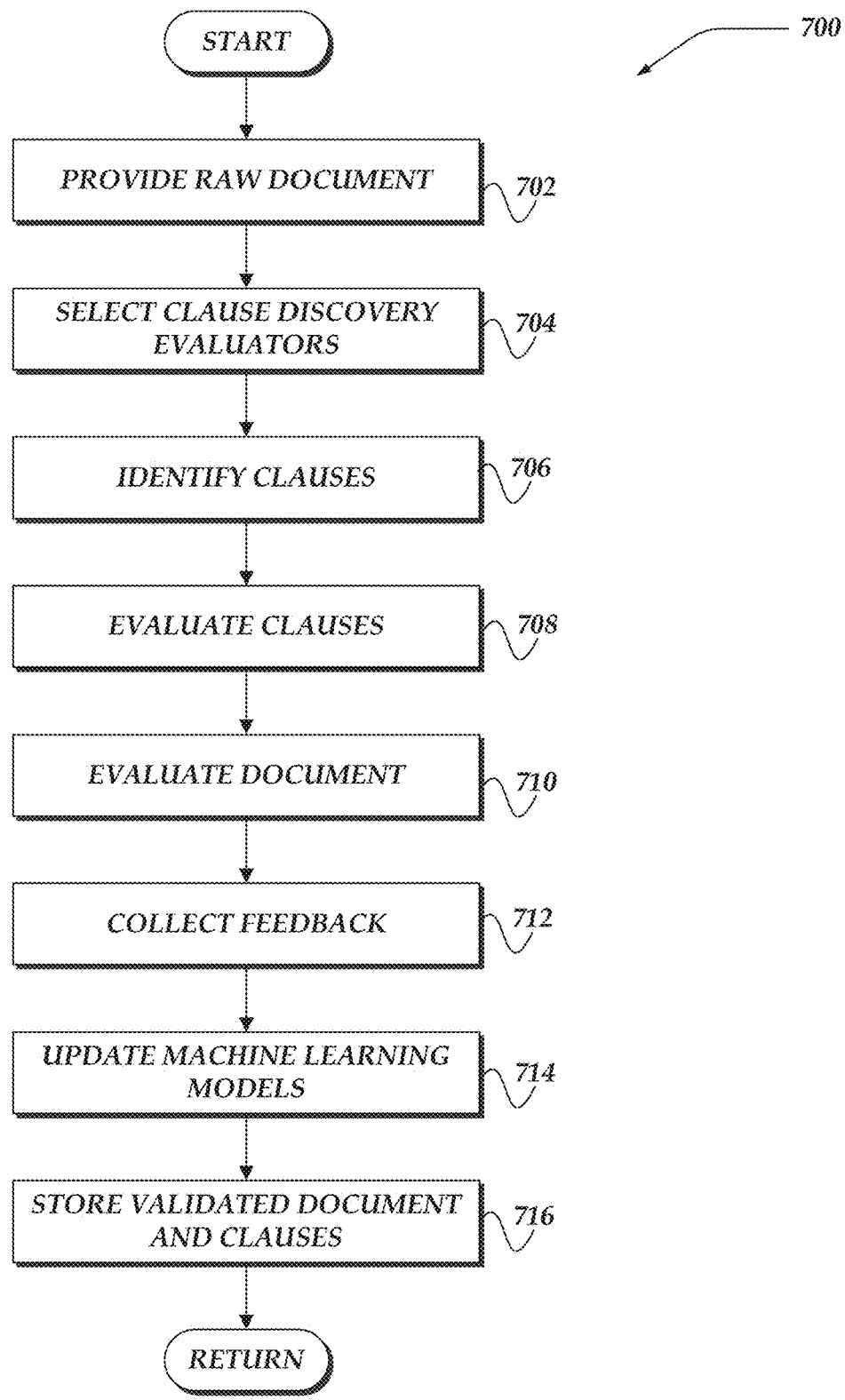
FIG. 7 illustrates an overview flowchart of a process for clause discovery for document validation in accordance with one or more of the various embodiments.

FIG. 7 illustrates an overview flowchart of process 700 for clause discovery for document validation in accordance with one or more of the various embodiments. After a start block, at block 702, in one or more of the various embodiments, one or more raw documents may be provided to a document engine. In this context, a raw document is a document that requires validation. In some cases, for some embodiments, the raw documents may have been previously validated. In other cases, for some embodiments, the raw documents may be new to the document validation system. In one or more of the various embodiments, raw documents may be provided from a document management store. In other embodiments, raw documents may be uploaded by users or other services.

At block 704, in one or more of the various embodiments, the document engine may be arranged to determine a rule based evaluator for identifying candidate clauses that may be in the raw document. In one or more of the various embodiments, the document engine may be arranged to select one or more evaluators that may be associated with the file format or file type of the raw document. In one or more of the various embodiments, such evaluators may include rules, regular expressions, grammars, or the like, that may be tailored to specific file formats or file types.

In one or more of the various embodiments, the document engine may be arranged to scan the raw document to determine its format or file type. Based on this determination an evaluator may be selected. In some embodiments, the evaluator may be generalized for a file format, such as, HTML, XML, RTF, MS Word, or the like. Accordingly, in one or more of the various embodiments, the document engine may parse the contents of the raw document according to its file format.

In one or more of the various embodiments, the file format of the raw document may require other pre-processing such as optical character recognition, or the like. Accordingly, in one or more of the various embodiments, the document engine may be arranged to perform the required pre-processing itself. Alternatively, in one or more of the various embodiments, the document engine may be arranged to forward the raw document to another service that may perform the pre-processing for the document engine.

Also, in one or more of the various embodiments, an organization may provide one or more custom evaluators that include rules, regular expressions, grammars, or the like, specifically designed for particular types of raw documents. For example, in some embodiments, an organization may use or be aware of a pre-defined style or template used to create the raw document being ingested. Accordingly, the organization may produce a custom evaluator that recognizes or otherwise takes advantage of the style or template used by the organization. Continuing with the example, the organization may employ a style or template that uses or includes specific formatting information in raw documents that indicate the start or end of clauses. Accordingly, in this example, the evaluator used by the document engine may be arranged to take advantage of this formatting for identifying clauses.

At block 706, in one or more of the various embodiments, the document engine may be arranged to identify one or more clauses from the raw document. In one or more of the various embodiments, the document engine may be arranged to rely on the formatting or structure in the raw document or one or more evaluators to identify the one or more clauses. Note, in some embodiments, the identified clauses may be considered candidate clauses because they may undergo additional processing or evaluation such that one or more clauses may be discarded, merged together, or the like.

At block 708, in one or more of the various embodiments, a validation engine may be instantiated to perform one or actions for evaluating or validate the one or more clauses. In one or more of the various embodiments, the validation engine may be arranged to determine or assign a clause category to the one or more clauses.

In one or more of the various embodiments, the validation engine may be arranged to analyze the one or more incoming clauses. Accordingly, in one or more of the various embodiments, the validation engine may generate one or more meta-data values that represent one or more of the characteristics of the one or more incoming clauses. In some embodiments, meta-data may include various values, such as, word count, page/document position, character counts, character distributions, word distributions, part-of-speech metrics, or the like, or combination thereof. In one or more of the various embodiments, one or more of the evaluation actions for providing meta-data values may be defined using one or more evaluators that may be based on one or more rules, configuration information, or the like. In some embodiments, one or more meta-data value evaluations may be depend on a previous evaluation. Accordingly, there may one or more hierarchal dependencies that trigger different evaluation actions to occur. For example, a validation engine may be configured to determine the word count of a clause and then if that word count exceeds a threshold value it may trigger another evaluation to occur that attempts to gather additional meta-data. These dependent or compound evaluations may be defined for various circumstance based on the type of document, clause category, the organizations preferences, or the like. In other words, two or more evaluators may be chained together.

In one or more of the various embodiments, validation engines may be arranged to evaluate the quality or confidence of clause category assignments. For example, in one or more of the various embodiments, a validation engine may determine that a clause is a 'liquidated damages clause' that defines a specific sum of money that comes due given certain breeches of the contract. However, for example, the 'liquidated damages clause' may be determined to be defective or otherwise of poor quality if the validation engine discovers that the clause is missing important concepts or facts. For example, in some embodiments, the validation engine may determine that a liquidated damages clause is poorly drafted because it omits a recited money value.

In one or more of the various embodiments, the validation engine may be arranged to compute a match confidence score that may be related to how well each clause matches the one or more clause categories it may be assigned. Note, in some embodiments, a validation engine may be arranged to associate or assign more than one match confidence score with a clause such that each confidence score corresponds to a different clause category. For example, a clause may be assigned a 50% confidence score for one clause category and 35% for another. In some cases, the validation engine may be unable to determine the clause category or two or more categories may have the same or similar match confidence score, the validation engine may be arranged to flag the clause as indeterminate. Accordingly, in one or more of the various embodiments, depending on the policy rules in place, the validation engine may perform actions, such as, notifying users, rejecting the clause, rejecting the document, request more information, or the like. In one or more of the various embodiments, the validation engine may be arranged to carry forward the two or more categories with one clause. This may enable subsequent actions to be performed to clear up the ambiguity.

In one or more of the various embodiments, validation engines may be arranged to evaluate the clauses by executing one or more evaluators that perform various matching operations to identify clause categories, determine quality scores, match confidence scores, or the like. In some embodiments, the validation engine may be arranged to perform semantic matching that attempts to associate clauses with clause categories based on the semantic meaning of their contents. Accordingly, in one or more of the various embodiments, validation engines may be arranged to analyze the part-of-speech, word meaning, phrases, or the like, to match clauses to clause categories.

Also, in some embodiments, the validation engine may attempt to match incoming clauses to clauses previously stored in the clause repository. Accordingly, in some embodiments, one or more clauses may be determined to be close or exact matches based on a comparison of their content to the content of known clauses. For example, in some embodiments, a validation engine may perform string comparisons of one or more incoming clauses with stored clauses. Accordingly, in this example, incoming clauses that are close or exact string match to a clause in the clause repository may be automatically assigned the same clause category as the clause in the clause repository. Further, in one or more of the various embodiments, validation engine may be arranged to match incoming clauses with clause in the clause repository based on meta-data information, hash/digest values, checksums, or the like, or combination thereof.

In one or more of the various embodiments, the validation engine may provide the one or more clauses to a machine learning engine that may further refine the evaluation of the clauses. In one or more of the various embodiments, one or more clauses may be provided as inputs to one or more machine learning models for evaluation or classification. In one or more of the various embodiments, the machine learning models may be used to strengthen or diminish result of non-machine learning based evaluations that occurred previously. In one or more of the various embodiments, one or more ML models may be associated with one or more clause categories such that confidence scores produced via the one or more ML models may be used to increase or decrease confidence scores that may be associated with the incoming clauses.

In one or more of the various embodiments, one or more ML models may be arranged to classify clauses based on the textual content of the incoming clauses. Also, in one or more of the various embodiments, one or more ML models may be arranged to classify clauses based on the some or all of the meta-data associated with the one or more ML models. Further, in some embodiments, both the textual content and some or all of the meta-data associated with a clause may be provided to one or more ML models to evaluate one or more of the incoming clauses.

At block 710, in one or more of the various embodiments, the validation engine may be arranged to evaluate the incoming document as a whole. In one or more of the various embodiments, this may include comparing the identified or validated incoming clauses with the document type of the incoming document to evaluate if there are missing or extraneous clauses. In one or more of the various embodiments, the document may be evaluated using a combination of evaluators, ML models, or the like. In one or more of the various embodiments, documents may be assigned a quality score that indicates how closely the document conforms to the expectations for a given document type. For example, in one or more of the various embodiments, an organization may define required clauses, optional clauses, prohibited clauses, or the like, for one or more document types.

At block 712, in one or more of the various embodiments, the validation engine may be arranged to collect feedback related to the quality of the clause evaluations from users or other services. In one or more of the various embodiments, low quality clauses or poorly matched clauses may be highlighted or emphasized for review.

In one or more of the various embodiments, some clauses may be fatally defective such that they require user intervention. In one or more of the various embodiments, such poorly classified clauses may be resubmitted for evaluation after corrections or edits are made.

In one or more of the various embodiments, corrections to the meta-data, classification, scoring, or the like, may be 'manually' provided. Accordingly, in one or more of the various embodiments, the validation engine may be arranged to track the corrections and use that information to update or recommend updates to one or more evaluators or ML models.

In one or more of the various embodiments, one or more clauses or documents may be associated with an extended workflow process that must be completed to finalize the intake or evaluation of the document and its clauses. Accordingly, in some embodiments, a result of the workflow may determine if the evaluation of the document and the clauses is acceptable or rejected.

At block 714, in one or more of the various embodiments, the machine learning engine may be arranged to retrain one or more ML models based on the feedback provided in block 712. In one or more of the various embodiments, the machine learning engine may be arranged to select one or more ML models for retraining based on the feedback provided. For example, if the feedback associated with one or more ML models indicates that one or more of the ML models have drifted out of compliance, the machine learning engine may be arranged to re-train those ML models using training data that includes recently validated clauses or documents that may be stored in the repository or elsewhere.

In one or more of the various embodiments, machine learning engines may be arranged to use one or more rules or configuration information that describe or define one or more conditions that may be trigger re-training. In some embodiments, different ML models may be associated with different re-training criteria as well as different re-training rules.

In one or more of the various embodiments, the validation engine may be arranged to identity ML models that may be ready for retraining. In one or more of the various embodiments, one or more ML model evaluators may be arranged to define one or more test, rules, condition, threshold score, or the like, that may be used to identify one or more ML models that may need retraining.

In one or more of the various embodiments, the validation engine may be arranged to evaluate the results produced during recent evaluation or validation of clauses or documents to determine if one or more ML models may need to be retrained. Likewise, in one or more of the various embodiments, the validation engine may be arranged to evaluate the results of evaluations to determine if new ML models should be trained. For example, one or more ML models may be determined to perform well for some clauses and not others. Accordingly, in one or more of the various embodiments, rather than re-train existing ML models one or more new ML models may be trained. For example, if an ML model classifies a clause into a category with a high confidence score and the clause is subsequently subjected to significant modification, perhaps ML models incorrectly classified the clause. Because giving it a high match confidence score while users still have to modify the content of the clause may indicate the ML models providing false positives. Accordingly, in some embodiments, those ML models should be retrained or new ML model should be trained.

In one or more of the various embodiments, the validation engine may be arranged to select the minimal number of ML models that require re-training based on its on-going real-time evaluation of the classification results, including confidence score. Also, in one or more of the various embodiments, the validation engine may monitor change activity that occurs for clauses or documents. Accordingly, in one or more of the various embodiments, the validation engine may identify one or more evaluations that may be inconsistent with how the user actually responds. For example, if the user has to modify so-called high confidence category matches, the ML models contributing to the high confidence score may be providing inaccurate classifications.

Note, in some embodiments, one or more evaluators may be provided to evaluator the result of the evaluations—evaluators that evaluation the quality of the evaluation results. Accordingly, in one or more of the various embodiments, if one or more evaluations are determined to substandard, the ML models associated with those substandard evaluations may be determined so they may be retrained. Or, in one or more of the various embodiments, new ML models may be generated. Accordingly, this optimized automated selection of ML models for re-training or creation of new ML models, minimizes the amount computing resources, such as, processor time, storage, network bandwidth, or the like, that is required by the machine learning engine.

At block 716, in one or more of the various embodiments, the validation engine may store the validated document and its validated clauses in the clause repository, a document management system, or other databases. Next, control may be returned to a calling process.

Figure 8:
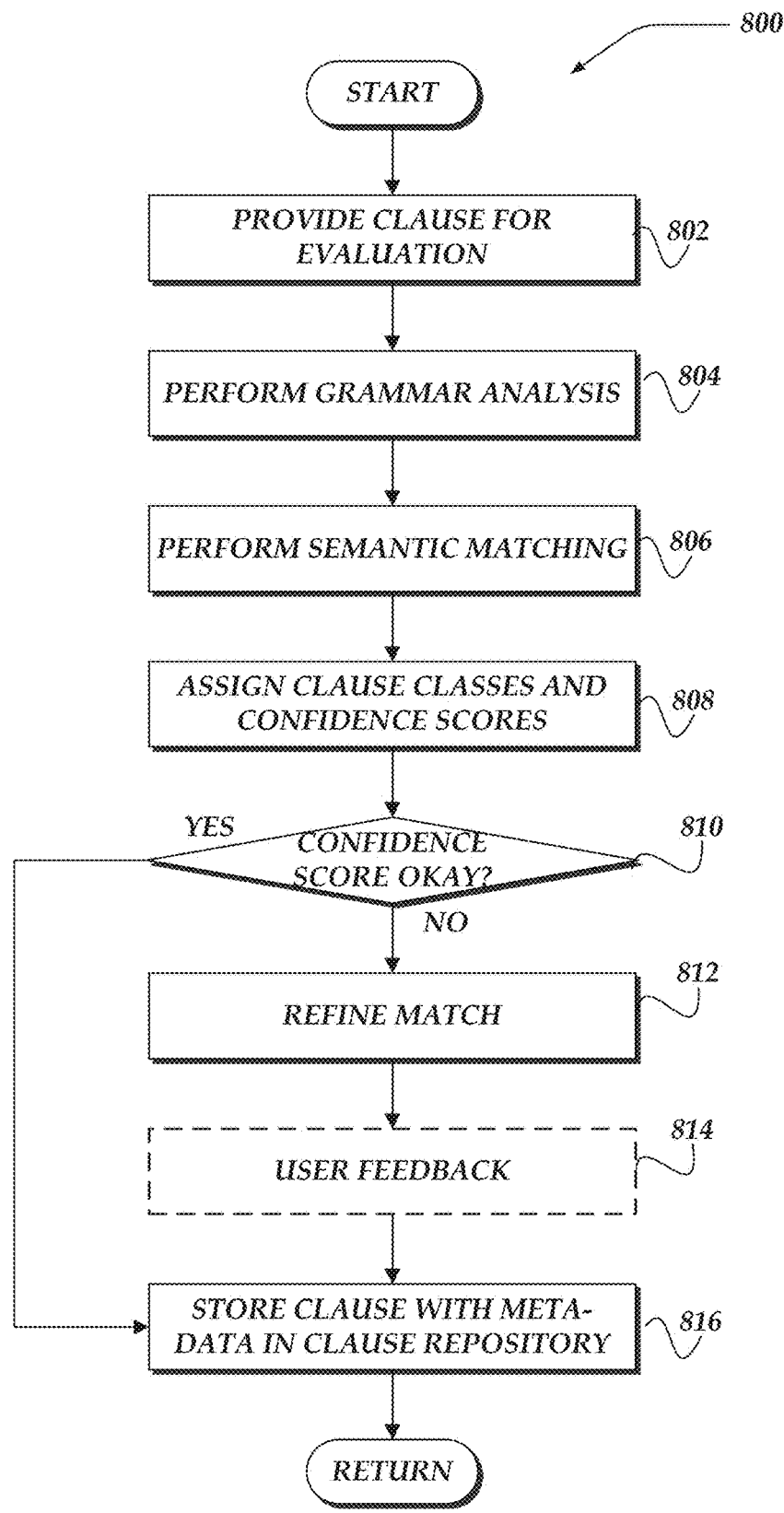
FIG. 8 illustrates a flowchart of a process for evaluating a clause for document validation in accordance with one or more of the various embodiments.

FIG. 8 illustrates a flowchart of process 800 for evaluating a clause for document validation in accordance with one or more of the various embodiments. After a start block, at block 802, in one or more of the various embodiments, a clause may be provided to a validation engine instantiated to perform one or more actions to evaluate the provided clauses.

At block 804, in one or more of the various embodiments, the validation engine may be arranged to perform grammar analysis of the text content of the clause. In some embodiments, grammar analysis includes identifying parts-of-speech, word counts, or the like. In one or more of the various embodiments, grammar analysis may be adapted for different languages (e.g., English vs. French), document type, problem domain, or the like. Accordingly, in some embodiments, the validation engine may be arranged to select grammar evaluators based on such considerations. In some embodiments, validation engines may be arranged to apply one or more rule-based policies for selecting one or more evaluators for parsing grammar, parts of speech, or the like.

In one or more of the various embodiments, grammar evaluators may also be arranged to discover or determine various meta-data values that generally are not semantic related, such as, word counts, word diversity, character count, or the like.

In one or more of the various embodiments, grammar evaluators may be arranged to identify one or more named entities based on string matches or pattern matches. Likewise, in some embodiments, one or more grammar evaluators may be arranged identify fields or entities such as dates, locations, email addresses, or the like.

At block 806, in one or more of the various embodiments, the validation engine may be arranged to perform one or more actions to perform semantic matching of the clause. In one or more of the various embodiments, the validation engine may be arranged to perform a variety of semantic matching actions in an attempt to determine one or more clause categories that may be associated with the clause.

Accordingly, in one or more of the various embodiments, the validation engine may be arranged to use one or more evaluators that use natural language processing or match methods to determine clause categories for the clause. In one or more of the various embodiments, evaluators may include one or more match methods that test for one or more pattern matches or string matches to determine the clause category for the clause being evaluated.

In one or more of the various embodiments, one or more of the semantic evaluators may include text fragments, patterns, structural definitions, or the like, that may correspond to one or more clause classes. In some cases, semantic evaluators may be targeted for one clause class. In other cases, for some embodiments, one or more semantic evaluators may be related such that a first evaluator provides a preliminary evaluation and follow on evaluators further refine the evaluation of the clause. For example, one semantic evaluator may determine that the clause is one of five clause categories out of fifty, then one or more follow on evaluators may further refine the evaluation down to a single clause class.

In one or more of the various embodiments, two or more semantic evaluators may be used to assign the same clause different clause classes. Accordingly, in one or more of the various embodiments, the validation engine may associate the clause with more than one clause class. In one or more of the various embodiments, different clause categories associated with the same clause may be associated with different confidence scores depending on the results produced by the evaluators that made the determinations.

In one or more of the various embodiments, one or more semantic evaluators may be arranged to perform full text matches that compare the clause with one or more validated clauses stored in the repository. Accordingly, in one or more of the various embodiments, the validation engine may determine if the clause is an exact or close match of previously validated clause.

At block 808, in one or more of the various embodiments, the validation engine may be arranged to assign one or more clause categories and confidence scores with the clause. As mentioned above, more than one clause category may be assigned to a single clause with each clause category having the same or different confidence score. In some embodiments, one or more semantic evaluators may be arranged to compute a confidence score based on the results of the evaluation. In some embodiments, two or more semantic evaluators may produce partial confidence scores that may be combined to provide a total initial confidence score for the different clause categories that may be associated with the clause. For example, in some embodiments, two semantic evaluators may be associated with the same clause class. Accordingly, in this example, the validation engine may be arranged to combine both of the scores they produce into a single confidence score. The combination method may vary depending on the semantic evaluators being used. Also, in some embodiments, one or more evaluators may be weighted heavier than others. In one or more of the various embodiments, evaluator score combination rules or configuration information may define arbitrary formulas for combining the partial scores, including, summation, averages, weighted averages, products, or the like.

At decision block 810, in one or more of the various embodiments, if the confidence score associated with the clause indicates that the validation engine has unambiguously associated the clause with a clause class, control may flow to block 814; otherwise, control may flow block 812. In one or more of the various embodiments, the validation engine may be arranged to compare the confidence scores related to clause category assignment to a threshold value. Accordingly, in one or more of the various embodiments, if the confidence score exceeds the threshold value, the validation engine may determine that the clause is accurately classified. If the confidence score is not high enough, the validation engine may determine the clause requires more evaluation before it can be validated or otherwise considered classified.

In one or more of the various embodiments, the validation engine may be arranged to apply one or more rules, one or more evaluators, or configuration information to obtain the confidence score threshold values that may be associated particular clause classes. In some embodiments, one or more rules may include formulas that may be applied to evaluate whether the clause needs to evaluated further. In some embodiments, clauses that are associated with two or more clause categories may be tested with formulas that apply the different confidence score that may be associated with clause class. For example, if a clause has been assigned two clause categories with the same or similar confidence score it may be defective or indeterminate. In contrast, in some embodiments, if the clause has be assigned two clause categories with the first clause category having a high confidence and the second clause category having a low confidence score, an evaluator may be arranged to accept the higher scoring category assignment and discard or ignore the lower scoring category assignment.

At block 812, in one or more of the various embodiments, the validation engine may be arranged to perform one or more additional operations to further refine the classification or validation of the clause. In one or more of the various embodiments, these operations may include applying additional evaluators, filters, machine learning models, or the like. In some embodiments, the additional evaluators may include activating one or more workflows that require user intervention or intervention from other services. In some embodiments, one or more filters or evaluators may be associated with specific clause categories while others may be associated with sets of clause categories.

Also, in one or more of the various embodiments, one or more ML models may be used to classify the clause based on the textual context of the clause, its meta-data, or combination thereof. Accordingly, the validation engine may be arranged to select one or more ML models for refining the validation or evaluation of the clause. In some embodiments, the ML models selected for classifying the clause may be based on the document type, clause meta-data, initial category assignment confidence scores, or the like, or combination thereof. In one or more of the various embodiments, the validation engine may be arranged to employ one or more evaluators, one or more rules, configuration information, or the like, for determining the criteria for selecting ML models.

Similar to semantic evaluators, ensembles of two or more ML models may be dependent such that one or more ML models may be used in sequence (e.g., chained) or in parallel. Accordingly, in one or more of the various embodiments, classification scores (e.g., results from each ML models) may be combined using formulas defined by the one or more evaluators, one or more rules, or the configuration information. In some embodiments, the rules or evaluators for applying ML models may include conditions, branching logic, control logic, or the like.

At block 814, in one or more of the various embodiments, optionally, the validation engine may provide the clause to one or more users to receive feedback regarding the present evaluation. Likewise, in one or more of the various embodiments, if unresolvable errors or inconsistencies were discovered by the validation engine, the clause may be presented to one or more users or other services for further evaluation or correction.

Note, this block is marked optional, because some clauses may require user feedback or intervention while others will not. Likewise, in some embodiments, the validation engine may be arranged to submit the entire document (with the evaluated clauses) to one or more users or other services for feedback or additional evaluation at the same time rather than getting feedback for each clause as it is evaluated.

At block 816, in one or more of the various embodiments, the validation engine may be arranged to store the clause and its meta-data in a clause repository. In one or more of the various embodiments, the clause may be stored with its meta-data as well as one or more journal records that record each modification that was made to the clause as well as records of other actions that may be have been taken by the document engine, validation engine, machine learning engine, or the like. Next, control may be returned to a calling process.

Figure 9:
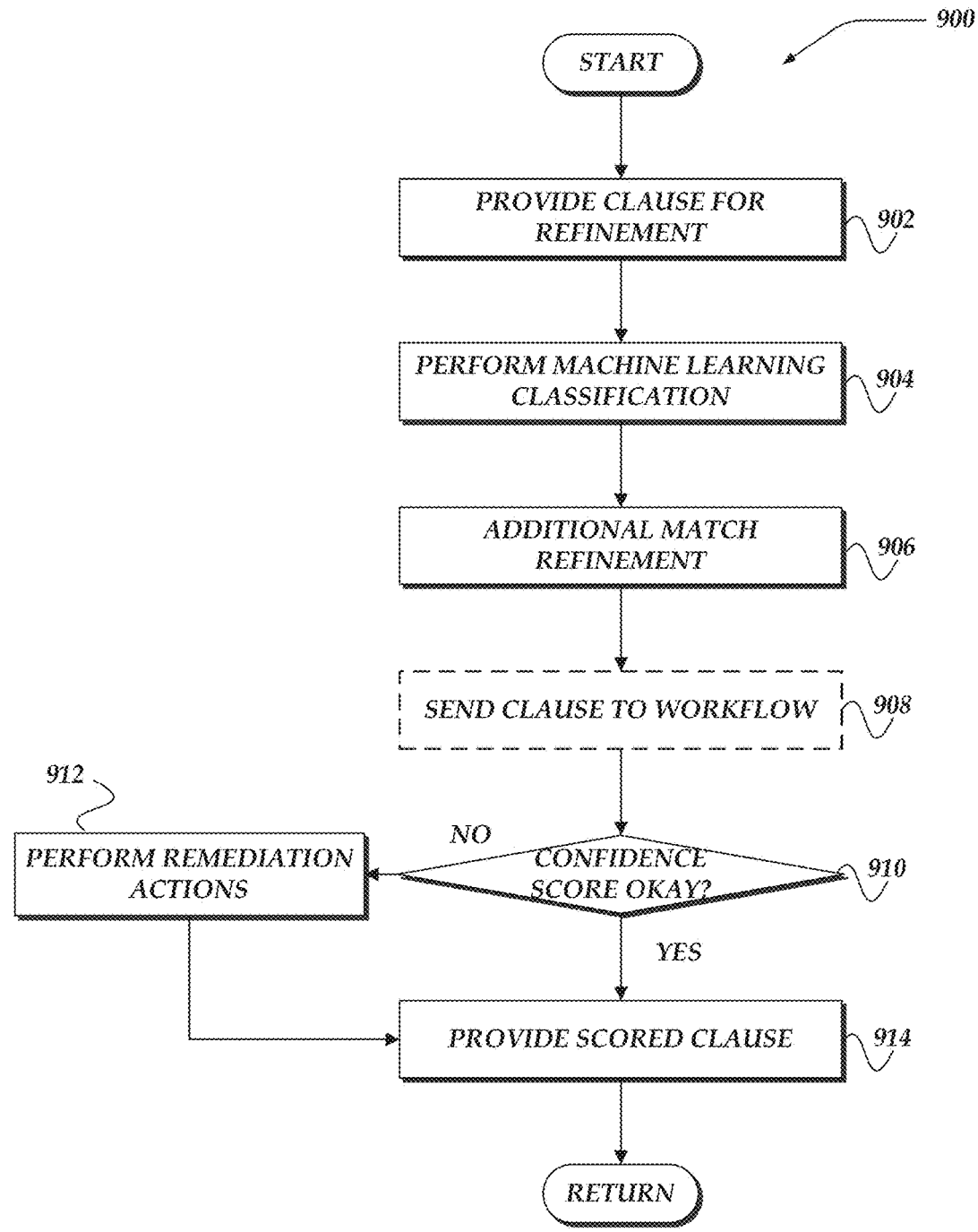
FIG. 9 illustrates a flowchart of a process for refining the evaluation of a clause in accordance with one or more of the various embodiments.

FIG. 9 illustrates a flowchart of process 900 for refining the evaluation of a clause in accordance with one or more of the various embodiments. After a start block, at block 902, in one or more of the various embodiments, a validation engine may provide a clause that may require further evaluation to refine its clause category assignment.

At block 904, in one or more of the various embodiments, a machine learning engine may be instantiated to perform actions including classification of the clause using one or more ML models. As mentioned above, one or more evaluators may include rules for application the one or more ML models to refine the evaluation of the clause.

At block 906, in one or more of the various embodiments, the validation engine maybe arranged to perform additional match refinement on the clause. In one or more of the various embodiments, additional refinement evaluators may be applied. These evaluators may be arranged to look for anomalies that may remain in the clause. In some embodiments, because the clauses may be nearly completely evaluated or validated, refinement evaluators may be arranged to discover edge conditions, outliers, or the like, that may have made it through the previous evaluators.

At block 908, in one or more of the various embodiments, optionally, the validation engine may be arranged to send the clause to a workflow for additional evaluation refinement. As mentioned above, one or more evaluators may be executed to determine if the clause requires a workflow to be applied to it before final approval. For example, depending on their characteristics, one or more clauses may be required to be reviewed by legal or domain experts before being accepted as validated.

At decision block 910, in one or more of the various embodiments, if a confidence score associated with the clause category assignment exceeds a threshold value, control may flow to block 914; otherwise, control may flow to block 912.

At block 912, in one or more of the various embodiments, the validation engine may be arranged to perform one or more additional remediation actions to improve the clause category assignment for the clause. In some embodiments, this may include notifying users, submitting the clause to a workflow for further evaluation or correction, and so on. In one or more of the various embodiments, the particular remediation actions may vary depending on the type of document or the clause class. Accordingly, in one or more of the various embodiments, the validation engine may be arranged to use one or more rules or configuration information that map one or more remediation actions to a clause.

At block 914, in one or more of the various embodiments, the validation engine may provide the evaluated or validated clause to the clause repository. Next, control may be returned to a calling process.

Figure 10:
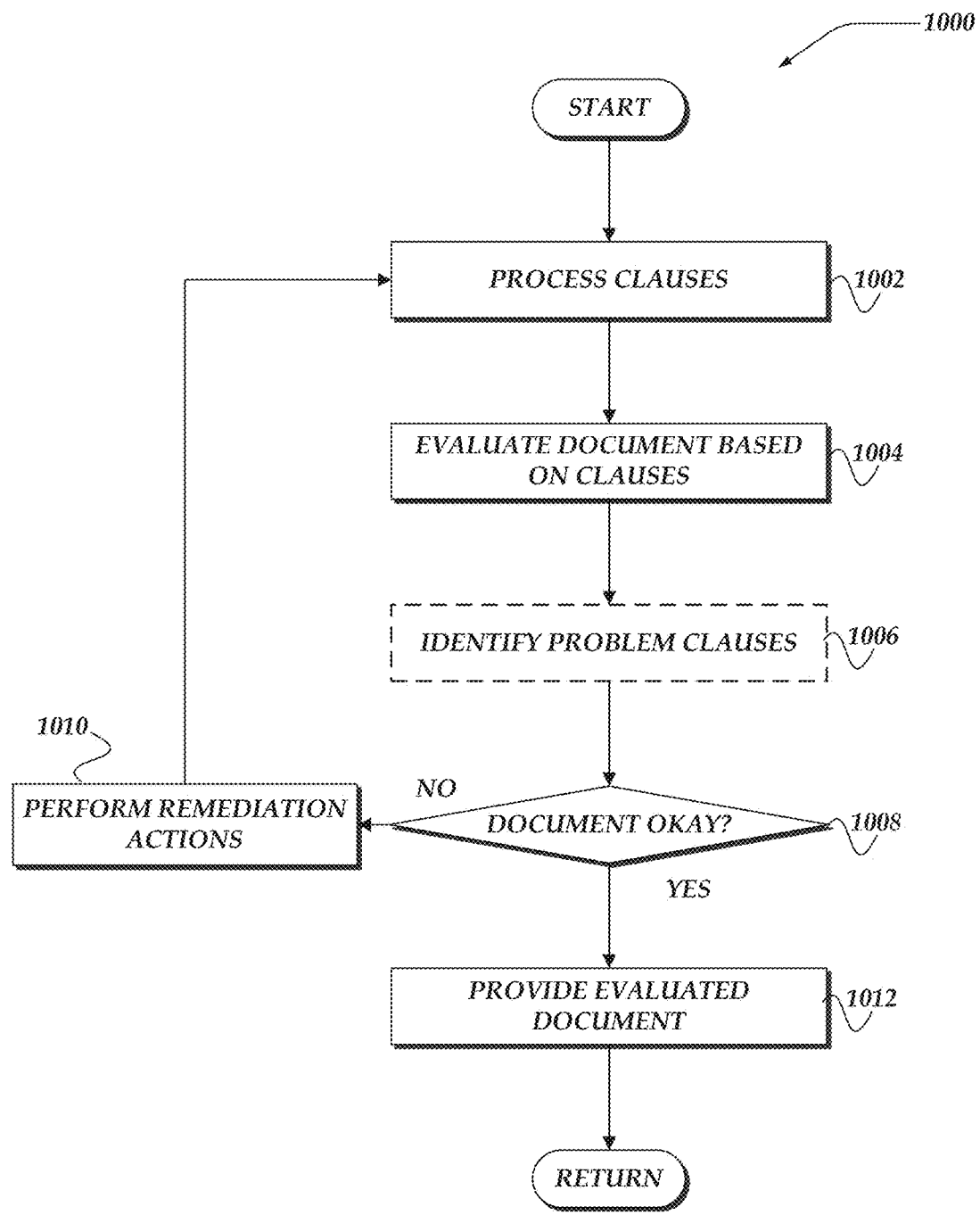
FIG. 10 illustrates a flowchart of a process for evaluating a document in accordance with one or more of the various embodiments.

FIG. 10 illustrates a flowchart of process 1000 for evaluating a document in accordance with one or more of the various embodiments. After a start block, at block 1002, in one or more of the various embodiments, a validation engine may evaluate the individual clauses included in a document. In one or more of the various embodiments, if the clauses included in a raw document have been evaluated and assign clause classes, the validation engine still needs to evaluate the document as a whole.

At block 1004, in one or more of the various embodiments, the validation engine may be arranged to evaluate the document as a whole based on the clauses. Similar to evaluating individual clauses, the validation engine may use one or more evaluators to evaluate the document. In one or more of the various embodiments, such evaluators (e.g., document evaluators) may be arranged to perform checks to determine if the proper or required clauses are included in a document, or the like.

At block 1006, in one or more of the various embodiments, optionally, one or more problematic clauses may be identified. In one or more of the various embodiments, document evaluators may identify one or more extraneous or out-of-place clauses. Accordingly, in one or more of the various embodiments, these clauses may be highlighted or otherwise emphasized to a user. Note, this block may be considered optional because not all documents will contain problematic clauses.

At decision block 1008, in one or more of the various embodiments, if the document is determined to be in good condition, control may flow to block 1012; otherwise, control may flow to block 1010. In one or more of the various embodiments, one or more document evaluators may provide a document quality score that may be compared against a defined threshold value to evaluate the quality of the document.

At block 1010, in one or more of the various embodiments, the validation engine may be arranged to perform one or more remediation actions to correct the defective document. In one or more of the various embodiments, the validation engine may be arranged to recommend one or more actions, such as, deleting duplicate or redundant clauses. In some embodiments, the remediation actions may include correcting or removing one or more clauses identified as being inconsistent with a document type.

At block 1012, in one or more of the various embodiments, the validation engine may be arranged to provide the validated document to a document management system or other database. Next, control may be returned to a calling process.

Figure 11:
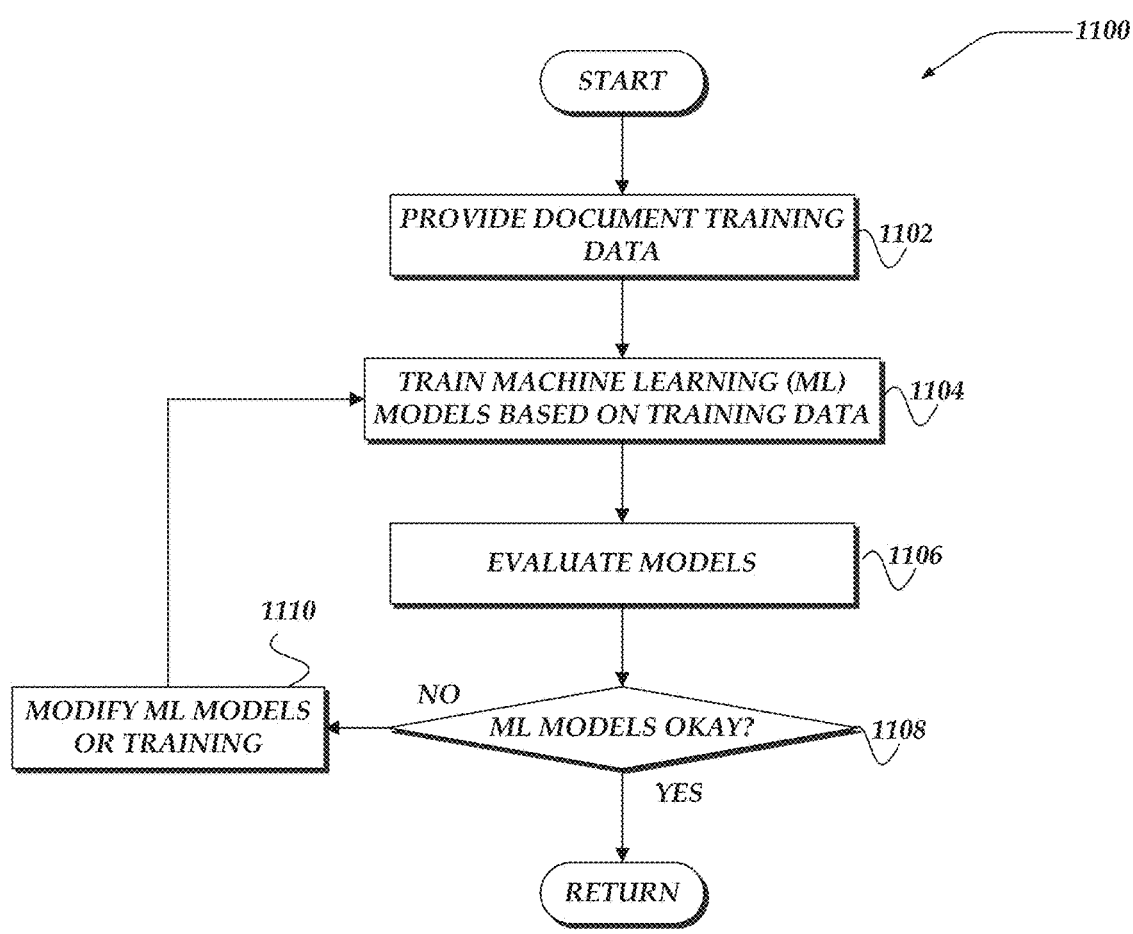
FIG. 11 illustrates a flowchart of a process for training machine learning models used for clause or document evaluation in accordance with one or more of the various embodiments.

FIG. 11 illustrates a flowchart of process 1100 for training machine learning models used for clause or document evaluation in accordance with one or more of the various embodiments. After a start block, at block 1102, in one or more of the various embodiments, a machine learning engine may be provided document training data. In one or more of the various embodiments, a machine learning engine may be provided training data in the form of a large collection of documents of a known quality and a known document type. In one or more of the various embodiments, the machine learning engine may be provided training data comprising clauses. In some embodiments, training data comprised of documents may be provided separate from training data comprised on clauses.

In one or more of the various embodiments, the training data may include documents or clauses from a clause repository, or the like. In some embodiments, the training data may have previously been classified or evaluated. In one or more of the various embodiments, the training data may have been processed by a validation engine or machine learning engine previously as described above. Accordingly, in one or more of the various embodiments, the training data may include labels, tags, meta-data, clause category assignment confidence scores, document quality scores, activity journal records, or the like.

Accordingly, the clauses or documents in the training data may be associated with meta-data generated by the validation engine during discovery or evaluation of the clauses. In some embodiments, the meta-data may include label information that may be used by the machine learning engine for training one or more machine learning (ML) models.

Alternatively, in one or more of the various embodiments, some of the training data may be unlabeled or partially labeled. Note, in some embodiments, some or all of the training data may be documents stored in a document management system or a clause repository. In other embodiments, the training data may be kept separate or isolated from the clause repository or document management server.

At block 1104, in one or more of the various embodiments, the machine learning engine may be arranged to train one or more ML models using the training data. In one or more of the various embodiments, the training methods may depend on the type of ML model being trained.

At block 1106, in one or more of the various embodiments, the validation engine or machine learning engine may be arranged to evaluate the trained ML models. In one or more of the various embodiments, a portion of the training data that has known characteristics may be evaluated using the ML models. Accordingly, in one or more of the various embodiments, ML models that classify the known clauses or documents with an accuracy rate that exceeds a defined threshold value may be considered sufficiently trained. Note, in some embodiments, different ML models may be associated with different accuracy threshold values. For example, some ML models types may be intended for gross classification that does not require precision accuracy. In some embodiments, other ML models that may require increased accuracy or precision may be associated with threshold values that correspond to increased accuracy or precision.

At decision block 1108, in one or more of the various embodiments, if the trained ML models are sufficiently trained, control may be returned to a calling process; otherwise, control may flow to block 1110.

At block 1110, in one or more of the various embodiments, the one or more of the ML models or one or more of the training routines may be modified. In one or more of the various embodiments, the machine learning engine may be arranged to automatically modify one or more parameters of the one or more ML models that require retraining. In other embodiments, the machine learning engine may enable data scientists to modify the ML models or select different ML models. Next, in some embodiments, control may loop back to block 1104, to re-train the ML models.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing documents over a network using one or more processors that execute instructions to perform actions, comprising:

instantiating a document engine to identify one or more clauses of natural language words in a document, wherein the document is associated with one or more document types, and wherein the one or more clauses are included in a data object as one or more self-referential records to improve the performance of computing resources employed to execute the instructions; and instantiating a validation engine to perform actions, including:

providing one or more evaluations for the one or more clauses based on one or more evaluators and one or more machine learning (ML) models, wherein the one or more evaluations are employed to assign each of the clauses to one of a plurality of categories, and wherein each of the one or more clauses is associated with a confidence score based on the one or more evaluations;

providing one or more semantic evaluators based on the one or more document types;

assigning the category and the confidence score to the one or more clauses based on the one or more evaluations performed by one or more of textual evaluators or the semantic evaluators;

determining the one or more ML models based on the category assigned to the one or more clauses;

classifying the one or more clauses based on the one or more ML models;

employing a result of the classification to modify the confidence score associated with the one or more clauses;

monitoring one or more actions associated with the one or more clauses, wherein the one or more actions include one or more updates to content of the one or more clauses; and identifying one or more inconsistent evaluations, wherein the inconsistent evaluations identify the one or more clauses that have a confidence score that exceeds a pre-determined high threshold value and also a quantity of content updates that exceeds another pre-determined high threshold value; and instantiating a machine learning (ML) engine to perform actions including:

retraining a portion of the one or more ML models based on the updated content of the one or more clauses associated with the inconsistent evaluations, wherein the retrained portion of the one or more ML models increases one or more confidence scores associated with each of the one or more clauses that already include content that is equivalent to the content updates of the one or more clauses associated with the inconsistent evaluations, and wherein the retrained portion of the one or more ML models decreases one or more confidence scores associated with the one or more clauses associated with the one or more inconsistent evaluations.

2. The method of claim 1, wherein providing the one or more evaluations, further comprises:

providing one or more textual evaluators that evaluate one or more of grammar, parts-of-speech, word-counts, or character counts of the one or more clauses.

3. The method of claim 1, further comprising, instantiating a feedback engine that performs actions, including:

displaying a report that includes the document and the one or more clauses, wherein the category and the confidence score associated with each clause is included in the report; and capturing the one or more actions that are stored in an activity journal.

4. The method of claim 1, wherein providing the one or more evaluations, further comprises:

comparing content of the one or more clauses to a previously evaluated clause that is stored in a repository; and assigning the category to the one or more clauses based on an affirmative result of the comparison, wherein the category that is assigned to the one or more clauses is the same category that is assigned to the previously evaluated clause.

5. The method of claim 1, wherein the validation engine performs further actions, including:

evaluating the document based on the one or more clauses and the one or more document types, wherein a quality score is assigned to the document based on the overall evaluation;

increasing the quality score for the document when the one or more clauses required by the one or more document types are included in the document; and decreasing the quality score for the document when the one or more clauses prohibited from the one or more document types are included in the document.

6. The method of claim 1, wherein the document engine performs further actions including:

scanning the document to determine its format and file type; and parsing the document based on its file format and file type to provide the one or more clauses.

7. The method of claim 1, wherein the validation engine performs further actions including:

identifying one or more entities included in the one or more clauses, wherein the one or more entities include one or more of dates, locations, email addresses, person names, party identifiers, or place names;

confirming that one or more values for the one or more entities are consistent throughout the document; and identifying the one or more clauses that incorrectly omit one or more of the one or more entities.

8. A processor readable non-transitory storage media that includes instructions for managing document over a network, wherein execution of the instructions by one or more processors on one or more network computers performs actions, comprising:

instantiating a document engine to identify one or more clauses of natural language words in a document, wherein the document is associated with one or more document types, and wherein the one or more clauses are included in a data object as one or more self-referential records to improve the performance of computing resources employed to execute the instructions; and instantiating a validation engine to perform actions, including:

providing one or more evaluations for the one or more clauses based on one or more evaluators and one or more machine learning (ML) models, wherein the one or more evaluations are employed to assign each of the clauses to one of a plurality of categories, and wherein each of the one or more clauses is associated with a confidence score based on the one or more evaluations;
providing one or more semantic evaluators based on the one or more document types;
assigning the category and the confidence score to the one or more clauses based on the one or more evaluations performed by one or more of textual evaluators or the semantic evaluators;
determining the one or more ML models based on the category assigned to the one or more clauses;
classifying the one or more clauses based on the one or more ML models;
employing a result of the classification to modify the confidence score associated with the one or more clauses;
monitoring one or more actions associated with the one or more clauses, wherein the one or more actions include one or more updates to content of the one or more clauses; and
identifying one or more inconsistent evaluations, wherein the inconsistent evaluations are associated with the one or more clauses that have a confidence score that exceeds a high threshold value and also a quantity of content updates that exceeds another high threshold value; and
instantiating a machine learning (ML) engine to perform actions including:
retraining a portion of the one or more ML models based on the updated content of the one or more clauses associated with the inconsistent evaluations, wherein the retrained portion of the one or more ML models associate one or more increased confidence scores with each of the one or more clauses that already include content that is equivalent to the content updates of the one or more clauses associated with the inconsistent evaluations, and wherein the retrained portion of the one or more ML models associate one or more decreased confidence scores with the one or more clauses associated with the one or more inconsistent evaluations.

9. The media of claim 8, wherein providing the one or more evaluations, further comprises:
providing one or more textual evaluators that evaluate one or more of grammar, parts-of-speech, word-counts, or character counts of the one or more clauses.

10. The media of claim 8, further comprising, instantiating a feedback engine that performs actions, including:
displaying a report that includes the document and the one or more clauses, wherein the category and the confidence score associated with each clause is included in the report; and
capturing the one or more actions that are stored in an activity journal.

11. The media of claim 8, wherein providing the one or more evaluations, further comprises: comparing content of the one or more clauses to a previously evaluated clause that is stored in a repository; and
assigning the category to the one or more clauses based on an affirmative result of the comparison, wherein the category that is assigned to the one or more clauses is the same category that is assigned to the previously evaluated clause.

12. The media of claim 8, wherein the validation engine performs further actions, including:
evaluating the document based on the one or more clauses and the one or more document types, wherein a quality score is assigned to the document based on the overall evaluation;
increasing the quality score for the document when the one or more clauses required by the one or more document types are included in the document; and
decreasing the quality score for the document when the one or more clauses prohibited from the one or more document types are included in the document.

13. The media of claim 8, wherein the document engine performs further actions including:
scanning the document to determine its format and file type; and
parsing the document based on its file format and file type to provide the one or more clauses.

14. The media of claim 8, wherein the validation engine performs further actions including:
identifying one or more entities included in the one or more clauses, wherein the one or more entities include one or more of dates, locations, email addresses, person names, party identifiers, or place names;
confirming that one or more values for the one or more entities are consistent throughout the document; and
identifying the one or more clauses that incorrectly omit one or more of the one or more entities.

15. A system for managing documents comprising:
a network computer, comprising:
a transceiver that communicates over the network;
a memory that stores at least instructions; and
one or more processors that execute instructions that perform actions, including:
instantiating a document engine to identify one or more clauses of natural language words in a document, wherein the document is associated with one or more document types, and wherein the one or more clauses are included in a data object as one or more self-referential records to improve the performance of computing resources employed to execute the instructions; and
instantiating a validation engine to perform actions, including:
providing one or more evaluations for the one or more clauses based on one or more evaluators and one or more machine learning (ML) models, wherein the one or more evaluations are employed to assign each of the clauses to one of a plurality of categories, and wherein each of the one or more clauses is associated with a confidence score based on the one or more evaluations;
providing one or more semantic evaluators based on the one or more document types;
assigning the category and the confidence score to the one or more clauses based on the one or more evaluations performed by one or more of textual evaluators or the semantic evaluators;
determining the one or more ML models based on the category assigned to the one or more clauses;
classifying the one or more clauses based on the one or more ML models;
employing a result of the classification to modify the confidence score associated with the one or more clauses;
monitoring one or more actions associated with the one or more clauses, wherein the one or more actions include one or more updates to content of the one or more clauses; and identifying one or more inconsistent evaluations, wherein the inconsistent evaluations are associated with the one or more clauses that have a confidence score that exceeds a high threshold value and also a quantity of content updates that exceeds another high threshold value; and instantiating a machine learning (ML) engine to perform actions including:

retraining a portion of the one or more ML models based on the updated content of the one or more clauses associated with the inconsistent evaluations, wherein the retrained portion of the one or more ML models associate one or more increased confidence scores with each of the one or more clauses that already include content that is equivalent to the content updates of the one or more clauses associated with the inconsistent evaluations, and wherein the retrained portion of the one or more ML models associate one or more decreased confidence scores with the one or more clauses associated with the one or more inconsistent evaluations; and a client computer, comprising:
 a transceiver that communicates over the network;
 a memory that stores at least instructions; and
 one or more processors that execute instructions that perform actions, including:
  providing the document to the document engine.

16. The system of claim 15, wherein providing the one or more evaluations, further comprises:
providing one or more textual evaluators that evaluate one or more of grammar, parts-of-speech, word-counts, or character counts of the one or more clauses.

17. The system of claim 15, further comprising, instantiating a feedback engine that performs actions, including:
displaying a report that includes the document and the one or more clauses, wherein the category and the confidence score associated with each clause is included in the report; and
capturing the one or more actions that are stored in an activity journal.

18. The system of claim 15, wherein providing the one or more evaluations, further comprises: comparing content of the one or more clauses to a previously evaluated clause that is stored in a repository; and
assigning the category to the one or more clauses based on an affirmative result of the comparison, wherein the category that is assigned to the one or more clauses is the same category that is assigned to the previously evaluated clause.

19. The system of claim 15, wherein the validation engine performs further actions, including:
evaluating the document based on the one or more clauses and the one or more document types, wherein a quality score is assigned to the document based on the overall evaluation;
increasing the overall quality score for the document when the one or more clauses required by the one or more document types are included in the document; and
decreasing the overall quality score for the document when the one or more clauses prohibited from the one or more document types are included in the document.

20. The system of claim 15, wherein the document engine performs further actions including:
scanning the document to determine its format and file type; and
parsing the document based on its file format and file type to provide the one or more clauses.

21. A network computer for managing documents, comprising:
a transceiver that communicates over the network;
a memory that stores at least instructions; and
one or more processors that execute instructions that perform actions, including:
 instantiating a document engine to identify one or more clauses of natural language words in a document, wherein the document is associated with one or more document types, and wherein the one or more clauses are included in a data object as one or more self-referential records to improve the performance of computing resources employed to execute the instructions; and
 instantiating a validation engine to perform actions, including:
  providing one or more evaluations for the one or more clauses based on one or more evaluators and one or more machine learning (ML) models, wherein the one or more evaluations are employed to assign each of the clauses to one of a plurality of categories, and wherein each of the one or more clauses is associated with a confidence score based on the one or more evaluations;
  providing one or more semantic evaluators based on the one or more document types;
  assigning the category and the confidence score to the one or more clauses based on the one or more evaluations performed by one or more of textual evaluators or the semantic evaluators;
  determining the one or more ML models based on the category assigned to the one or more clauses;
  classifying the one or more clauses based on the one or more ML models;
  employing a result of the classification to modify the confidence score associated with the one or more clauses;
  monitoring one or more actions associated with the one or more clauses, wherein the one or more actions include one or more updates to content of the one or more clauses; and
  identifying one or more inconsistent evaluations, wherein the inconsistent evaluations are associated with the one or more clauses that have a confidence score that exceeds a high threshold value and also a quantity of content updates that exceeds another high threshold value; and
  instantiating a machine learning (ML) engine to perform actions including: retraining a portion of the one or more ML models based on the updated content of the one or more clauses associated with the inconsistent evaluations, wherein the retrained portion of the one or more ML models associate one or more increased confidence scores with each of the one or more clauses that already include content that is equivalent to the content updates of the one or more clauses associated with the inconsistent evaluations, and wherein the retrained portion of the one or more ML models associate one or more decreased confidence scores with the one or more clauses associated with the one or more inconsistent evaluations.

22. The network computer of claim 21, wherein providing the one or more evaluations, further comprises:
providing one or more textual evaluators that evaluate one or more of grammar, parts-of-speech, word-counts, or character counts of the one or more clauses.

23. The network computer of claim 21, further comprising, instantiating a feedback engine that performs actions, including:

displaying a report that includes the document and the one or more clauses, wherein the category and the confidence score associated with each clause is included in the report; and capturing the one or more actions that are stored in an activity journal.

24. The network computer of claim 21, wherein providing the one or more evaluations, further comprises: comparing content of the one or more clauses to a previously evaluated clause that is stored in a repository; and assigning the category to the one or more clauses based on an affirmative result of the comparison, wherein the category that is assigned to the one or more clauses is the same category that is assigned to the previously evaluated clause.

25. The network computer of claim 21, wherein the validation engine performs further actions, including:

evaluating the document based on the one or more clauses and the one or more document types, wherein a quality score is assigned to the document based on the overall evaluation;

increasing the quality score for the document when the one or more clauses required by the one or more document types are included in the document; and decreasing the quality score for the document when the one or more clauses prohibited from the one or more document types are included in the document.

26. The network computer of claim 21, wherein the document engine performs further actions including:

scanning the document to determine its format and file type; and parsing the document based on its file format and file type to provide the one or more clauses.

\* \* \* \* \*